US010684390B1

(12) United States Patent
Wagstaff et al.

(10) Patent No.: US 10,684,390 B1
(45) Date of Patent: Jun. 16, 2020

(54) SYSTEMS AND METHODS FOR DETECTING A SITTING DUCK SCENARIO

(71) Applicant: SmartDrive Systems, Inc., San Diego, CA (US)

(72) Inventors: David Wagstaff, San Diego, CA (US); Samuel Thomas Kruse, San Diego, CA (US); Jason Palmer, San Diego, CA (US)

(73) Assignee: SmartDrive Systems, Inc., San Diego, CA (US)

( * ) Notice: Subject to any disclaimer, the term of this patent is extended or adjusted under 35 U.S.C. 154(b) by 0 days.

(21) Appl. No.: 16/798,218

(22) Filed: Feb. 21, 2020

(51) Int. Cl.
*G01V 11/00* (2006.01)
*G07C 5/00* (2006.01)
*G01C 21/36* (2006.01)

(52) U.S. Cl.
CPC ........ *G01V 11/002* (2013.01); *G01C 21/3697* (2013.01); *G07C 5/008* (2013.01)

(58) Field of Classification Search
CPC .................................................. G01C 21/3697
See application file for complete search history.

(56) References Cited

U.S. PATENT DOCUMENTS

| | | | | |
|---|---|---|---|---|
| 9,987,981 B1* | 6/2018 | Deyaf | ..................... | G08G 1/166 |
| 2007/0260395 A1* | 11/2007 | Matsuoka | .......... | G01C 21/3614 |
| | | | | 701/425 |
| 2012/0054028 A1* | 3/2012 | Tengler | ............. | G01C 21/3697 |
| | | | | 705/14.49 |
| 2014/0229568 A1* | 8/2014 | Raffa | ...................... | H04W 4/44 |
| | | | | 709/217 |
| 2015/0356793 A1* | 12/2015 | Dietz | ....................... | G07C 5/00 |
| | | | | 701/1 |
| 2017/0238258 A1* | 8/2017 | Ramalho de Oliveira | .................. | |
| | | | | H04W 52/0261 |
| | | | | 455/574 |
| 2019/0122552 A1* | 4/2019 | Chen | ..................... | H04W 4/029 |
| 2019/0186930 A1* | 6/2019 | Chen | ..................... | G06Q 10/02 |

* cited by examiner

*Primary Examiner* — Alex C Dunn
(74) *Attorney, Agent, or Firm* — Esplin & Associates, PC

(57) ABSTRACT

Systems and methods for detecting a sitting duck scenario of a vehicle on or near a road are disclosed. The current location and speed of the vehicle are used for different comparisons and/or determinations, including a comparison to road-specific information to determine whether the vehicle is in a particular proximity of a highway, and a determination whether the vehicle has been stationary continuously for at least a specified duration. Additional comparisons and/or determinations may be used. If such an occurrence has been detected, one or more notifications are generated, and provided to one or more of the vehicle operator and/or a remote computing server.

20 Claims, 4 Drawing Sheets

SYSTEMS AND METHODS FOR DETECTING A SITTING DUCK SCENARIO

FIELD OF THE DISCLOSURE

The present disclosure relates to systems and methods for detecting certain traffic scenarios involving stationary vehicles. For example, detections may involve stalled, parked, or inoperative vehicles, which may be situated proximate or adjacent to actual and/or potential other traffic.

BACKGROUND

Monitoring vehicle operations is known, in particular for the occurrence of events such as speeding or collisions. Video monitoring of vehicles or vehicle operators during operation is known.

SUMMARY

One aspect of the present disclosure relates to a system configured for detecting a sitting duck scenario of a vehicle on or near a road, the vehicle being operated by a vehicle operator. The system may include one or more hardware processors configured by machine-readable instructions. The system may be configured to obtain output signals conveying information pertaining to the vehicle and to operation of the vehicle. The system may be configured to determine a current speed of the vehicle. The determination of the current speed is based on the output signals. The system may be configured to determine a current location of the vehicle. The determination of the current location is based on the output signals. The system may be configured to obtain road-specific information for one or more roads near the current location of the vehicle. The road-specific information may include: i) one or more types of road pertaining to the one or more roads near the current location of the vehicle, and ii) one or more types of geographical location information pertaining to the one or more roads. The system may be configured to make a first determination whether the current location of the vehicle is on or within a particular proximity of highways. The highways are public roads heading in one or more directions, having one or more lanes heading in the one or more directions. The one or more lanes are intended to include vehicular traffic. The first determination is based on the current location and the obtained road-specific information. The particular proximity is determined based on a distance threshold of 100 feet or less. The system may be configured to make a second determination whether the vehicle has been stationary continuously for at least a specified duration, wherein the specified duration is at least 5 minutes. The system may be configured to detect an occurrence of a particular vehicle event responsive to a combination of at least two determinations. The at least two determinations include the first determination that the current location of the vehicle is on or within the particular proximity of highways and the second determination that the vehicle has been stationary continuously for at least the specified duration. Responsive to detection of the occurrence of the particular vehicle event, the system may be configured to generate one or more notifications regarding the particular vehicle event. The system may be configured to provide the one or more notifications to one or more of the vehicle operator and/or a remote computing server.

Another aspect of the present disclosure relates to a method for detecting a sitting duck scenario of a vehicle on or near a road, the vehicle being operated by a vehicle operator. The method may include obtaining output signals conveying information pertaining to the vehicle and to operation of the vehicle. The method may include determining a current speed of the vehicle. The determination of the current speed is based on the output signals. The method may include determining a current location of the vehicle. The determination of the current location is based on the output signals. The method may include obtaining road-specific information for one or more roads near the current location of the vehicle. The road-specific information may include: i) one or more types of road pertaining to the one or more roads near the current location of the vehicle, and ii) one or more types of geographical location information pertaining to the one or more roads. The method may include making a first determination whether the current location of the vehicle is on or within a particular proximity of highways. The highways are public roads heading in one or more directions, having one or more lanes heading in the one or more directions. The one or more lanes are intended to include vehicular traffic. The first determination is based on the current location and the obtained road-specific information. The particular proximity is determined based on a distance threshold of 100 feet or less. The method may include making a second determination whether the vehicle has been stationary continuously for at least a specified duration, wherein the specified duration is at least 5 minutes. The method may include detecting an occurrence of a particular vehicle event responsive to a combination of at least two determinations. The at least two determinations include the first determination that the current location of the vehicle is on or within the particular proximity of highways and the second determination that the vehicle has been stationary continuously for at least the specified duration. Responsive to detection of the occurrence of the particular vehicle event, the method may include generating one or more notifications regarding the particular vehicle event. The method may include providing the one or more notifications to one or more of the vehicle operator and/or a remote computing server.

As used herein, any association (or relation, or reflection, or indication, or correspondency) involving servers, processors, client computing platforms, vehicles, vehicle operators, roads, types of roads, lanes, sensors, locations, directions, determinations, detections, durations, goals, recommendations, notifications, vehicle events, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
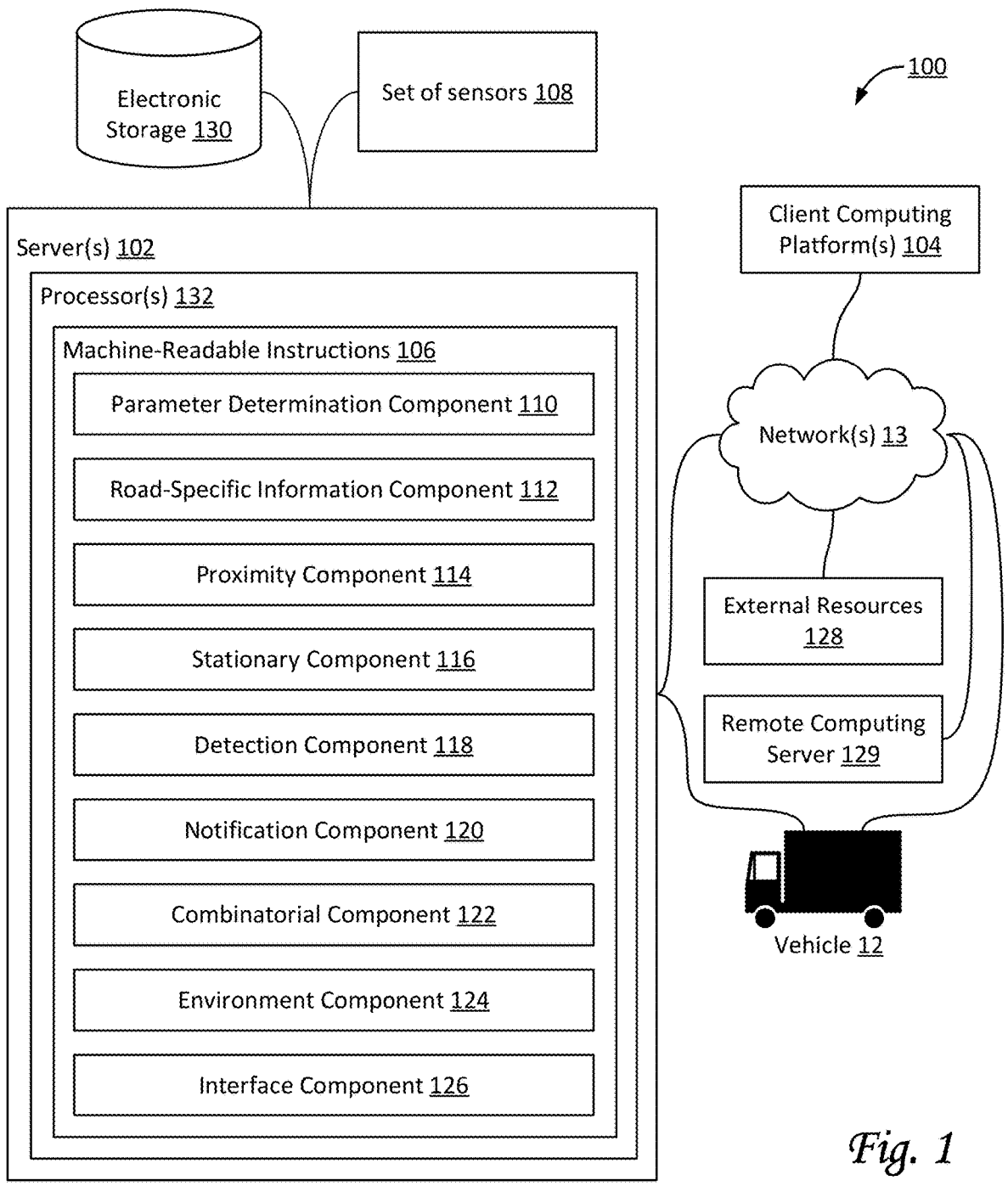
FIG. 1 illustrates a system configured for detecting a sitting duck scenario of a vehicle on or near a road, the vehicle being operated by a vehicle operator, in accordance with one or more implementations.

FIG. 1 illustrates a system 100 configured for detecting a sitting duck scenario of a vehicle on or near a road, the vehicle being operated by a vehicle operator, in accordance with one or more implementations. As used herein, the term "sitting duck" may refer to a vehicle that has been stationary continuously for at least a specified duration (in some implementations of at least five minutes) on or within a particular proximity of the nearest road. Additional conditions to specify this term may be considered within the scope of this disclosure. In some implementations, the vehicle's engine may be on or off. Typically, vehicles stuck in traffic or parked legally are not considered as sitting duck. In some implementations, the term "shoulder" of a road may be defined as an emergency stopping lane, typically on the right of the right-most lane in countries that drive on the right, and typically wide enough to accommodate a stopped vehicle without impeding the flow of traffic. Vehicles in a lane, on the shoulder of the road, and/or partially in a lane and partially on the shoulder may be considered as sitting duck. In some implementations, a sitting duck scenario may be caused due to a vehicle being out of fuel. In some implementations, a sitting duck scenario may be caused due to mechanical and/or electrical malfunction. In some implementations, a sitting duck scenario may be caused due to a collision and/or other accident. In some implementations, a sitting duck scenario may be caused due to a change of drivers, a driver sleeping, resting, and/or taking a break, and/or other circumstances initiated by a driver. Other causes and combinations of multiple causes may be considered in detecting a sitting duck scenario. From the perspective of a driver, truck owner, fleet manager, and/or other stakeholder, vehicles in a sitting duck scenario may be at risk, e.g., due to other traffic. Accordingly, system 100 is configured to detect these scenarios and provide notifications (e.g., warnings) related to these detected scenarios. In some implementations, a vehicle that uses system 100 may be configured to take certain actions responsive to these detected scenarios, as described elsewhere in this disclosure. In some implementations, system 100 may include the vehicle itself, whereas in other implementations system 100 may exclude the vehicle itself.

The roads vehicles are on or near may include public roads, private roads, and/or other types of roads. By way of non-limiting example, the types of public roads may include highways having one or more traffic lanes heading in one or more directions. Individual roads may head into one or more directions of travel. In some implementations, the roads may include one or more traffic lanes in each direction of travel. Traffic lanes may be intended to include vehicular traffic. In some implementations, individual roads may have (direction-based) centerlines between traffic lanes heading in opposite directions. In some implementations, individual roads may have (geometry-based) centerlines in the geometric center of all the traffic lanes that form the entire road in all directions. In some implementations, highways may have controlled entries and/or exits, such as (metered) on-ramps and off-ramps. In some implementations, highways may have a dividing strip between traffic in opposite directions. In some implementations, highways may have certain speed limits, such as, for example, at least 40 mph, at least 45 mph, at least 50 mph, at least 55 mph, at least 60 mph, at least 65 mph, and/or other ranges of speed limits. In some implementations, highways may be characterized by a lack of traffic lights. In some implementations, the classification of whether a road is a highway may be under government control. In some implementations, the classification of roads may include roads being classified as primary roads, secondary roads, rural roads, city roads, and/or other types of roads. For example, a government-controlled entity may provide road-specific information, e.g., an online database, that includes the types of road for multiple roads in a particular geographical area, such as, by way of non-limiting example, a state, a county, a city, a municipal entity, and/or other particular geographical areas.

In some implementations, system 100 may include one or more of servers 102, electronic storage 130, a set of sensors 108, network(s) 13, client computing platform(s) 104, external resources 128, a remote computing server 129, and/or other components. System 100 and/or components thereof may be carried and/or otherwise supported by one or more vehicles (e.g., a first vehicle, a second vehicle, a third vehicle, and so forth), including but not limited to a vehicle 12. Operation of system 100 may be described in the context of a particular vehicle, e.g., vehicle 12, but this is not intended to be limiting. In some implementations, system 100 may detect sitting duck scenarios for a fleet of multiple vehicles. In some implementations, individual vehicles (e.g., vehicle 12) may carry and/or otherwise support system 100 and/or components thereof. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Individual vehicles may include a set of resources for information gathering, data processing, and/or electronic storage, including but not limited to persistent storage. Individual vehicles may include sensors (e.g., set of sensors 108 configured to generate and/or otherwise gather data, such as output signals). In some implementations, individual vehicles may be configured to detect vehicle events, e.g., based on output signals generated by set of sensors 108. As used herein, the term "vehicle event" may include occurrences of events involving one or more vehicles. As such, detection of vehicle events may include gathering information by monitoring the operation of one or more vehicles, including but not limited to information related to current or past vehicle speeds, current or current location, and/or other information pertinent to detecting of vehicle events, particularly occurrences of sitting duck scenarios.

In some implementations, operation of vehicle 12 may be actively and primarily controlled by a vehicle operator (i.e., a human operator). In such a case, a non-human vehicle operator may take over (or be requested to take over) control of the vehicle in certain circumstances. In some implementations, operation of vehicle 12 may be actively and primarily controlled by an autonomous driving algorithm (also referred to as an algorithmic vehicle operator, or a non-human vehicle operator). In such a case, a human vehicle operator may take over (or be requested to take over) control of the autonomous driving algorithm, e.g., responsive to extreme and/or unconventional driving scenarios, or responsive to a failure or error-condition of the autonomous driving algorithm. In some implementations, a human vehicle operator and an autonomous driving algorithm may form a team that controls operations of vehicle 12 together.

Set of sensors 108 may be configured to generate output signals conveying information related to (operation of) vehicle 12, a location of vehicle 12, a vehicle operator of vehicle 12, and/or a context of vehicle 12 (e.g., related to the surroundings of vehicle 12). In some implementations, set of sensors 108 may be carried by vehicle 12. In some implementations, one or more sensors in set of sensors 108 may be external to vehicle 12, such as roadside sensors, sensors embedded in the surface of a road, sensors carried by other vehicles, and/or other sensors. Although set of sensors 108 is depicted in FIG. 1 as a single element, this is not intended to be limiting. In some implementations, set of sensors 108 may be configured to generate output signals continuously, in an on-going manner, and/or at regular or irregular intervals during operation of vehicle 12.

Information related to the operation of vehicle 12 may include feedback information from one or more of the mechanical systems (not shown in FIG. 1) of vehicle 12, and/or other information. The mechanical systems of vehicle 12 may include, for example, the engine, the drive train, the lighting systems (e.g., headlights, brake lights), the braking system, the transmission, fuel delivery systems, and/or other mechanical systems. The mechanical systems of vehicle 12 may include one or more mechanical sensors, electronic sensors, and/or other sensors that generate the output signals (e.g., seat belt sensors, tire pressure sensors, etc.). In some implementations, at least one of sensors 14 may be a vehicle system sensor included in an Engine Control Module (ECM) system of vehicle 12.

In some implementations, set of sensors 108 may generate output signals conveying information related to a vehicle operator of vehicle 12, such as visual information, motion-related information, position-related information, biometric information, medical information, and/or other information. In some implementations, set of sensors 108 may include one or more sensors configured to generate output signals that convey information related to biological activity of the vehicle operator. In some implementations, one or more sensors may be wearable by the vehicle operator. In some implementations, one or more sensors may be placed in physical proximity to the vehicle operator to facilitate monitoring the biological activity of the vehicle operator. The information related to the biological activity of the vehicle operator may include heart rate, respiration rate, verbal expressions, responses to conditions in the physical environment in and/or around vehicle 12, and/or other characteristics of or information about the vehicle operator.

In some implementations, set of sensors 108 may generate output signals conveying information related to the context of vehicle 12, such as information related to the environment in and/or around vehicle 12. The vehicle environment may include spaces in and around an interior and an exterior of vehicle 12. The information related to the context of vehicle 12 may include information related to movement of vehicle 12, an orientation of vehicle 12, a geographic position of vehicle 12, a spatial position of vehicle 12 relative to other objects, a tilt angle of vehicle 12, an inclination/declination angle of vehicle 12, and/or other information. In some implementations, the output signals conveying the information related to the context of vehicle 12 may be generated via non-standard aftermarket sensors installed in vehicle 12. Set of sensors 108 may include, for example, one or more of an image sensor, a camera, a video camera, a microphone, an accelerometer, a gyroscope, a geolocation sensor (e.g., a Global Positioning System or GPS device), a radar detector, a magnetometer, lidar (e.g., for measuring distance of a leading vehicle), an altimeter (e.g. a sonic altimeter, a radar altimeter, and/or other types of altimeters), a barometer, a magnetometer, a pressure sensor (e.g. a static pressure sensor, a dynamic pressure sensor, a pitot sensor, etc.), a thermometer, an inertial measurement sensor, a tilt sensor, a motion sensor, a vibration sensor, an ultrasonic sensor, an infrared sensor, a light sensor, a depth sensor, an air speed sensor, a ground speed sensor, an altitude sensor, medical sensors (including but not limited to blood pressure sensor, pulse oximeter, heart rate sensor, etc.), degree-of-freedom sensors (e.g. 6-DOF and/or 9-DOF sensors), a compass, and/or other sensors. As used herein, the term "motion sensor" may include one or more sensors configured to generate output conveying information related to position, location, distance, motion, movement, acceleration, and/or other motion-based parameters. Output signals generated by individual sensors (and/or information based thereon) may be stored and/or transferred in electronic files. In some implementations, output signals may be transferred as one or more streams of data.

As used herein, the terms "camera" and/or "image sensor" may include any device that captures image information, including but not limited to a single lens-based camera, a camera array, a solid-state camera, a mechanical camera, a digital camera, an image sensor, a depth sensor, a remote sensor, a lidar, an infrared sensor, a (monochrome) complementary metal-oxide-semiconductor (CMOS) sensor, an active pixel sensor, and/or other sensors. Individual sensors may be configured to capture information, including but not limited to visual information, video information, audio information, geolocation information, orientation and/or motion information, depth information, distance information, and/or other information. Information captured by one or more sensors may be marked, timestamped, annotated, and/or otherwise processed such that information captured by other sensors can be synchronized, aligned, annotated, and/or otherwise associated therewith. For example, video information captured by an image sensor may be synchronized with information captured by an accelerometer or other sensor. In some implementations, set of sensors 108 may include multiple cameras positioned around the vehicle and synchronized together to provide a 360-degree view of the inside of a vehicle and/or a 360-degree view of the outside of a vehicle. In some implementations, an image sensor may be integrated with electronic storage such that captured information may be (processed and) stored in the integrated embedded storage. In some implementations, a sensor may be configured to transfer captured information to remote electronic storage media, e.g. through "the cloud."

Server(s) 102 may be configured by machine-readable instructions 106. Machine-readable instructions 106 may include one or more instruction components. The instruction components may include computer program components. The instruction components may include one or more of a parameter determination component 110, a road-specific information component 112, a proximity component 114, a stationary component 116, a detection component 118, a notification component 120, a combinatorial component 122, an environmental component 124, an interface component 126, and/or other instruction components.

Parameter determination component 110 may be configured to determine parameters. For example, the parameters may pertain to the operation of vehicle 12, the current speed of vehicle 12, the current location of vehicle 12, the context of or pertaining to vehicle 12, environmental conditions in or near vehicle 12, and/or other parameters. In some implementations, parameter determination component 110 may be configured to obtain information. The obtained information may include one or more of output signals generated by set of sensors 108, parameters determined based on output signals generated by set of sensors 108, information from external resources 128, and/or other information. For example, in some implementations, parameter determination component 110 may be configured to obtain output signals from set of sensors 108 that convey information pertaining to vehicle 12 and to the operation of vehicle 12, and further configured to determine a current speed of vehicle 12 based on the obtained output signals. In some implementations, parameter determination component 110 may be configured to obtain the current speed of vehicle 12. For example, in some implementations, parameter determination component 110 may be configured to obtain output signals from set of sensors 108 that convey information pertaining to the current location of vehicle 12, and further configured to determine the current location of vehicle 12 based on the obtained output signals. In some implementations, parameter determination component 110 may be configured to obtain the current location of vehicle 12. In some implementations, parameter determination component 110 may be configured to determine and/or obtain the current orientation and/or heading of vehicle 12, either relative to the nearest road, or using an absolute representation such as a real-world coordinate system.

Road-specific information component 112 may be configured to obtain road-specific information. For example, the road-specific information may include information for one or more roads near the current location of vehicle 12 (e.g., as determined and/or obtained by parameter determination component 110). In some implementations, the road-specific information may include one or more of the types of roads near the current location of vehicle 12, the types of geographical location information of the roads near the current location of vehicle 12, and/or other road-specific information. For example, the types of road may include public roads, private roads, and/or other types of roads. In some implementations, the types of roads may include highways, expressways, city streets, residential streets, and/or other types of roads. In some implementations, the types of roads may include 2-lane highways, 4-lane highways, 6-lane highways, 8-lane highways, multi-lane highways, and/or other types of roads. In some implementations, road-specific information may include how many traffic lanes are heading in each direction, how many traffic lanes in total form the entire road in both directions, and/or other specific information regarding one or more traffic lanes of a particular road. For example, in some implementations, the road-specific information may specify the number and width of the individual traffic lanes of a particular road. In some implementations, road-specific information may include local speed limits. In some implementations, road-specific information may be obtained from one or more external databases, e.g., from one or more external resources 128.

In some implementations, geographical location information may specify and/or represent the geographical location of a specific road. For example, the geographical location of a particular road may include GPS information (e.g., a set of GPS coordinates). For example, in some implementations, the road may be assumed to approximate straight lines between adjacent GPS coordinates (e.g., in a set or sequence of GPS coordinates). In some implementations, the geographical information may indicate the (direction-based or geometry-based) centerline of an entire multi-lane multi-directional road. In some implementations, the geographical location of a particular road may include multiple sets of GPS coordinates, using individual sets for individual directions of travel or for individual lanes. In some implementations, the geographical location of a particular road may include two sets of GPS coordinates such that the road may be assumed to exist between boundaries defined by each of the sets. For example, the first set may define the boundary on the outside of the right-most traffic lane heading in a first direction (e.g., North), and the second set may define the boundary on the outside of the right-most traffic lane heading in a second direction (e.g., South), such that this particular road is located between the first and second boundaries. In some implementations, a boundary may define the edge of a traffic lane intended to include vehicular traffic. In some implementations, a boundary may define the edge of the shoulder of road. The particular type of the geographical location information may indicate what the geographical location information represents and/or how it should be interpreted in relation to the geographical location of a particular road. For example, for a first type of 2-lane road, a first type of geographical location information may indicate a particular centerline. For example, for a second type of 2-lane road, a second type of geographical location information may indicate the boundaries of the road (e.g., excluding emergency lanes). For example, for a third type of 2-lane road, a third type of geographical location information may indicate individual (geometry-based) centerlines for each of the lanes. Likewise, many different types of geographical location information may be used to represent the geographical location of a specific 4-lane highway, 6-lane highway, 8-lane highway, and so forth. In some implementations, a particular road may have a different number of traffic lanes heading in opposite directions. In such cases, the direction-based centerline between the traffic lanes heading in opposite directions (e.g., North and South) may not be in the geometric center of the outer boundaries of the entire road.

Proximity component 114 may be configured to make determinations regarding the current location of vehicle 12 in relation to one or more roads near vehicle 12. In some implementations, proximity component 114 may be configured to determine which particular road is closest or proximate to the current location of vehicle 12, and/or what type of road is closest or proximate to the current location of vehicle 12. For example, one determination may be whether vehicle 12 is in a lane of a highway. For example, one determination may be whether any part of vehicle 12 is in a lane of a highway. For example, one determination may be whether vehicle 12 is proximate or adjacent to a lane of a highway. This type of determination may depend of the type of vehicle, the location of one or more GPS sensors on vehicle 12, the heading and/or orientation of vehicle 12 relative to the heading of the nearest traffic lane, and/or other information. For example, one determination may be whether vehicle 12 is within a particular proximity of a highway. For example, the particular proximity may be 25 feet, 50 feet, 75 feet, 100 feet, 150 feet, and/or another distance. For example, one determination may be whether any part of vehicle 12 is within a particular proximity of a highway. In some implementations, one determination may be whether vehicle 12 is within a particular proximity of a road that has a speed limit of at least 40 mph, 45 mph, 50 mph, 55 mph, 60 mph, 65 mph, and/or other ranges of speed limits. In some implementations, the heading and/or orientation of vehicle 12 relative to the heading of the nearest traffic lane may be based on GPS information. In some implementations, the heading and/or orientation of vehicle 12 relative to the heading of the nearest traffic lane may be determined based on processed video information from set of sensors 108.

In some implementations, the particular proximity (as used by proximity component 114) may depend dynamically on one or more of the type of the nearest road, the number and type of traffic lanes, the type of available geographical location information for the nearest road, the local speed limit for the nearest road, and/or other road-specific information. For example, in some implementations, the particular proximity used to determine whether vehicle 12 is within the particular proximity of a highway may be 25 feet for 2-lane roads and 50 feet for 4-lane roads (such that the particular proximity depends dynamically on the number of lanes for the nearest road). In some implementations, certain types of roads, such as on-ramps to highways and off-ramps of highways, may be excluded from consideration for determinations by proximity component 114 (such that a vehicle is not considered within a particular proximity of a highway in case the vehicle is on an on-ramp or off-ramp). For example, in some implementations, the particular proximity used to determine whether vehicle 12 is within the particular proximity of a highway may be 25 feet for roads for which the location of the boundaries are known/available and 50 feet for roads for which only the centerline is known, and the location of the boundaries is not available (such that the particular proximity depends dynamically on the type of available geographical location information for the nearest road). For example, in some implementations, the particular proximity used to determine whether vehicle 12 is within the particular proximity of a highway may be 25 feet for roads for which the location of the shoulder is known/available and 50 feet for roads for which the location of the shoulder is not available (or roads that have no shoulder). In some implementations, the particular proximity may dynamically depend on a combination of multiple factors, such as the number of lanes and the type of available geographical location information, and/or other factors). In some implementations, the particular proximity may dynamically depend on vehicle-specific information. For example, the used particular proximity may be greater for a larger truck and smaller for a small truck or personal vehicle. For example, the used particular proximity may be greater for a truck carrying combustible goods and smaller for a truck carrying non-combustible goods. In some implementations, the particular proximity may dynamically depend on fleet-specific information. For example, the used proximity may be greater for any vehicle in a first fleet of vehicles and smaller for any vehicle in a second fleet of vehicles. For example, a fleet manager and/or other stakeholder may enter and/or select information, via a user interface, that is used to (dynamically) determine the particular proximity.

Figure 3:
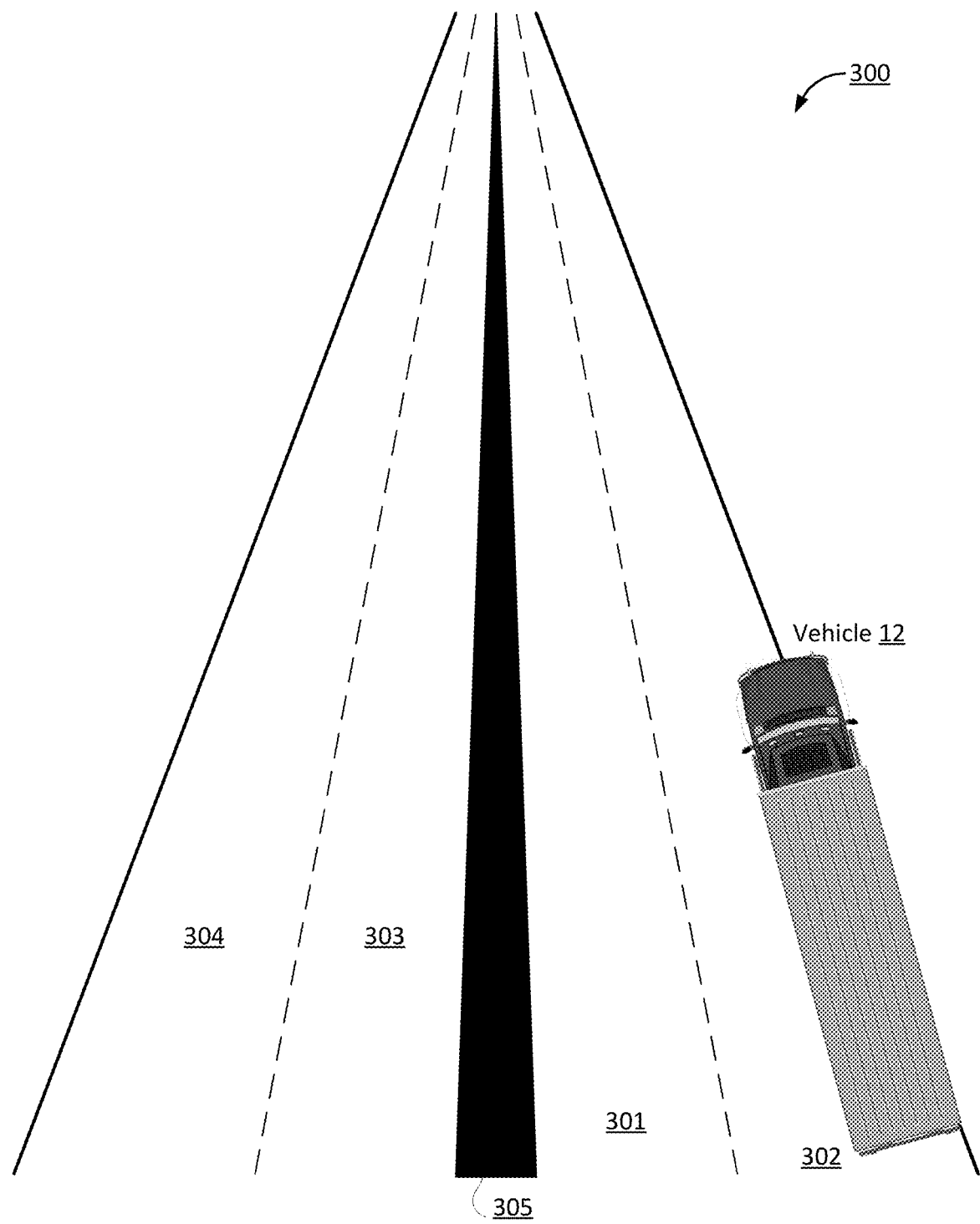
FIGS. 3 and 4 illustrate exemplary roads as may be used by a system configured for detecting a sitting duck scenario of a vehicle on or near a road, the vehicle being operated by a vehicle operator, in accordance with one or more implementations.

By way of non-limiting example, FIG. 3 illustrates an exemplary road 300 as may be used by system 100. As depicted, road 300 is a 4-lane highway that includes two lanes in each direction, divided by a dividing strip 305. Lanes 301 and 302 are heading in the same direction. Lanes 303 and 304 are heading in the opposite direction as lanes 301 and 302. Vehicle 12 is partially on a lane 302. System 100 (depicted in FIG. 1) may be configured to determine that vehicle 12 is within a particular proximity (of, say, 25 feet) of road 300, because at least part of vehicle 12 is in lane 302.

Figure 4:
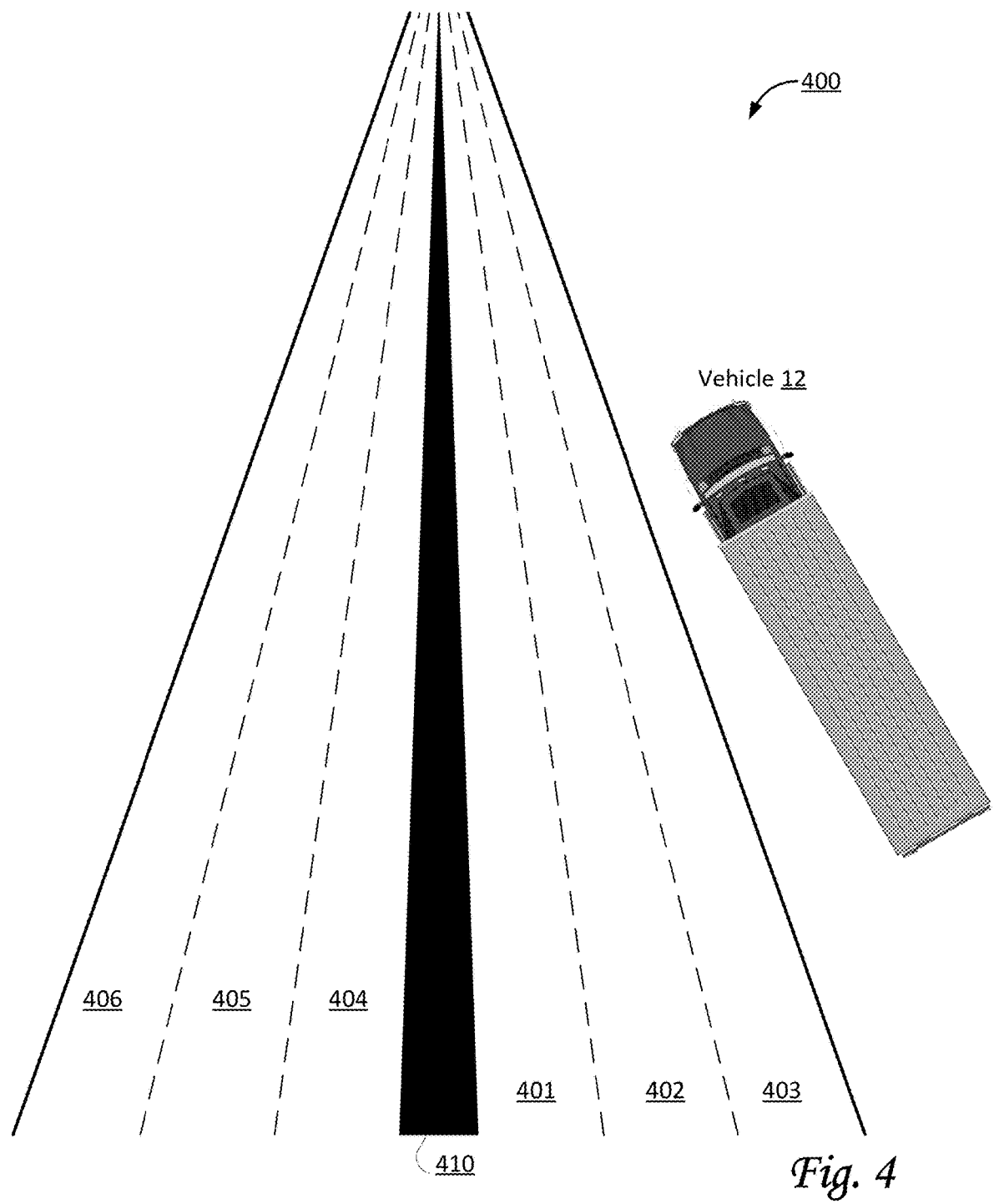

By way of non-limiting example, FIG. 4 illustrates an exemplary road 400 as may be used by system 100. As depicted, road 400 is a 6-lane highway that includes three lanes in each direction, divided by a dividing strip 410. Lanes 401, 402, and 403 are heading in the same direction. Lanes 404, 405, and 406 are heading in the opposite direction as lanes 401, 402, and 403. Vehicle 12 is not on any of the lanes. System 100 (depicted in FIG. 1) may be configured to determine that vehicle 12 is within a particular proximity (of, say, 25 feet) of road 400, because at least part of vehicle 12 is within 25 feet of lane 403. In some implementations, system 100 may be configured to determine that vehicle 12 is stationary in an orientation parallel to road 400 (e.g., the differential angle between the orientation of vehicle 12 and lane 403 is less than 30 degrees, which may be considered parallel).

Referring to FIG. 1, stationary component 116 may be configured to determine whether vehicle 12 is or has been stationary. In some implementations, determinations regarding vehicle 12 being stationary may be based on the current speed of vehicle 12 (e.g., the current speed being zero). In some implementations, stationary component 116 may be configured to determine whether vehicle 12 has been stationary continuously for at least a specified duration. In some implementations, the specified duration may be at least 2 minutes, 3 minutes, 5 minutes, 10 minutes, 15 minutes, 20 minutes, and/or another specified duration. In some implementations, the specified duration may vary based on other factors, including but not limited to time of day, weather conditions, visibility conditions, traffic conditions, and/or other factors. In some implementations, a determination whether vehicle 12 is stationary includes a requirement that the engine of vehicle 12 is turned off. In some implementations, no requirement regarding the engine is used to determine whether vehicle 12 is stationary. In some implementations, a determination whether vehicle 12 is stationary includes a requirement that vehicle 12 itself is turned off. In some implementations, no requirement regarding vehicle 12 being turned off is used to determine whether vehicle 12 is stationary. In some implementations, a determination whether vehicle 12 is stationary may include a determination that vehicle 12 is inoperable.

Detection component 118 may be configured to detect vehicle events, including but not limited to vehicle events of vehicle 12. In some implementations, detections by detection component 118 may be based on one or more of the current operation of vehicle 12, information pertaining to vehicle 12, current parameters of vehicle 12 (e.g., as determined by parameter determination component 110), road-specific information, determinations by other components of system 100, and/or other factors, as well as combinations thereof. For example, a particular vehicle event may be detected based on a combination of multiple determinations (e.g., at least two determinations, or at least three determinations, or at least more than three determinations). For example, a particular vehicle event may be detected based on a combination of a first determination that the current location of vehicle 12 is within a particular proximity of the nearest highway, and a second determination that vehicle 12 has been stationary continuously for at least a specified duration. For example, a particular vehicle event may be detected based on a combination of the first determination, the second determination, and a third determination that vehicle 12 is not in a designated area for stopping vehicles. In some implementations, a combination may be used of the first determination, the second determination, and another determination that vehicle 12 is stationary in an orientation that is parallel to the nearest road (e.g., the differential angle between the orientation of vehicle 12 and the nearest road is less than, e.g., 20, 30, and/or 45 degrees, which may be considered parallel). In some implementations, a combination may be used of the first determination, the second determination, and another determination that vehicle 12 was traveling at least a particular speed (e.g., 50 mph), for at least a particular duration (e.g., 5 minutes), in a particular time frame (e.g., a duration of at least 10 minutes immediately preceding the determination that vehicle 12 has become stationary). Other combinations and the use of additional determinations are considered within the scope of this disclosure.

In some implementations, designated areas for stopping vehicles may include different types of geographical areas, including one or more of rest stops, travel centers, truck stops, parking areas, vista points, over-night stay locations, 'stop-n-park' locations, 'park-n-ride' locations, common stop areas (e.g., these may have been identified and/or designated based on historical usage by other vehicles, crowd-sourcing by drivers, and/or through other information-gathering techniques), fueling stations, combinations of fueling stations and restaurants, other combinations that include one or more fueling stations, and/or other designated areas. In some implementations, a designated area may be indicated and/or defined by a polygon, e.g., using GPS coordinates and/or other real-world coordinates. In some implementations, information regarding designated areas for stopping vehicles may be obtained from external databases.

In some implementations, a determination that a particular vehicle is in a particular designated area for stopping vehicles may be implemented as the entirety of the particular vehicle being completely within the polygon that defines and/or indicates the particular designated area. In some implementations, a determination that a particular vehicle is in a particular designated area for stopping vehicles may be implemented as at least half of the particular vehicle being within the polygon that defines and/or indicates the particular designated area. In some implementations, a determination that a particular vehicle is near a particular designated area for stopping vehicles may be implemented as all or some of the particular vehicle being within a particular proximity of the polygon that defines and/or indicates the particular designated area.

Notification component 120 may be configured to generate notifications, including but not limited to notifications regarding detected vehicle events. In some implementations, notification component 120 may be configured to provide notifications to one or more of a vehicle operator of vehicle 12, remote computing server 129, one or more manual reviewers, one or more fleet managers, one or more supervisors of the vehicle operator of vehicle 12, and/or other stakeholders. In some implementations, notification component 120 may be configured to generate reports that include information regarding detected vehicle events. For example, notification component 120 may be configured to provide a notification to the vehicle operator of vehicle 12 (e.g., through a user interface within vehicle 12, or through a client computing device associated with the vehicle operator) that warns the vehicle operator regarding a detected vehicle event and/or provides a suggestion to move vehicle 12 further from the nearest road.

Combinatorial component 122 may be configured to make combinations of multiple determinations (e.g., 2, 3, 4, or more determinations, either sequentially, simultaneously, and/or arranged in a particular pattern). For example, in some implementations, a combination may include two determinations that occur at substantially the same time, and/or within a short window of time of 1, 2, 3, 4, 5, or more minutes. For example, in some implementations, a combination may include an initial two determinations that occur at substantially the same time, followed by one or more determinations that are made within a particular window of time after the initial two determinations. More elaborate sequences of combinations are considered within the scope of this disclosure. For example, a combination may include a first determination that vehicle 12 was traveling at least, say, 50 mph for at least, say, 5 minutes in a particular time frame. The particular time frame may include a duration of at least, say, 10 minutes immediately preceding the specified duration for a determination that the vehicle has been stationary.

Environmental component 124 may be configured to obtain current environmental conditions, e.g., based on the current location of vehicle 12. In some implementations, environmental conditions may include weather conditions. In some implementations, environmental conditions may include visibility conditions. In some implementations, environmental conditions may include traffic conditions. Combinations of multiple different types of environmental conditions are envisioned within the scope of this disclosure, such as, by way of non-limiting example, weather conditions, visibility conditions, and traffic conditions. In some implementations, environmental conditions may include road-surface conditions such as wet, dry, icy, and/or other conditions for the surface(s) of one or more particular roads. In some implementations, certain determinations in system 100 may be based, at least in part, on obtained environmental conditions. For example, a proximity threshold of 30 feet may be increased to 40 feet responsive to poor visibility conditions.

Interface component 126 may be configured to generate, effectuate, and/or present user interfaces to users, including but not limited to vehicle operators, vehicle owners, fleet managers, and/or other stakeholders. In some implementations, notifications may be provided through one or more user interfaces in one or more vehicles. In some implementations, interface component 126 may be configured to present a particular user interface on a particular client computing platform to a particular user. In some implementations, a user interface may include one or more controllers, joysticks, track pad, a touch screen, a keypad, touch sensitive and/or physical buttons, switches, a keyboard, knobs, levers, a display, speakers, a microphone, an indicator light, a printer, and/or other interface devices. User interfaces may be configured to facilitate interaction between users and system 100, including but not limited to receiving user input from users. In some implementations, received user input may, e.g., be used to select which determinations are to be used for vehicle event detection. In some implementations, received user input may, e.g., be used to select a particular proximity to be used for determinations by proximity component 114 and/or another component of system 100.

In some implementations, server(s) 102, client computing platform(s) 104, and/or external resources 128 may be operatively linked via one or more electronic communication links. For example, such electronic communication links may be established, at least in part, via one or more network(s) 13 such as the Internet and/or other networks. It will be appreciated that this is not intended to be limiting, and that the scope of this disclosure includes implementations in which server(s) 102, client computing platform(s) 104, and/or external resources 128 may be operatively linked via some other communication media.

A given client computing platform 104 may include one or more processors configured to execute computer program components. The computer program components may be configured to enable an expert or user associated with the given client computing platform 104 to interface with system 100 and/or external resources 128, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 128 may include sources of information outside of system 100, external entities participating with system 100, and/or other resources. In some implementations, some or all of the functionality attributed herein to external resources 128 may be provided by resources included in system 100.

Remote computing server 129 may be separate, discrete, and/or distinct from individual vehicles (such as vehicle 12), and/or system 100. In some implementations, remote computing server 129 may be configured to receive, analyze, and/or otherwise process information from one of more vehicles, including but not limited to vehicle 12. In some implementations, remote computing server 129 may be configured to receive notifications from vehicle 12.

Server(s) 102 may include electronic storage 130, one or more processors 132, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 130 may comprise non-transitory storage media that electronically stores information. The electronic storage media of electronic storage 130 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Electronic storage 130 may store software algorithms, information determined by processor(s) 132, information received from server(s) 102, information received from client computing platform(s) 104, and/or other information that enables server(s) 102 to function as described herein.

Processor(s) 132 may be configured to provide information processing capabilities in server(s) 102. As such, processor(s) 132 may include one or more of a digital processor, an analog processor, a digital circuit designed to process information, an analog circuit designed to process information, a state machine, and/or other mechanisms for electronically processing information. Although processor(s) 132 is shown in FIG. 1 as a single entity, this is for illustrative purposes only. In some implementations, processor(s) 132 may include a plurality of processing units. These processing units may be physically located within the same device, or processor(s) 132 may represent processing functionality of a plurality of devices operating in coordination. Processor(s) 132 may be configured to execute components 110, 112, 114, 116, 118, 120, 122, 124, and/or 126, and/or other components. Processor(s) 132 may be configured to execute components 110, 112, 114, 116, 118, 120, 122, 124, and/or 126, and/or other components by software; hardware; firmware; some combination of software, hardware, and/or firmware; and/or other mechanisms for configuring processing capabilities on processor(s) 132. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 110, 112, 114, 116, 118, 120, 122, 124, and/or 126 are illustrated in FIG. 1 as being implemented within a single processing unit, in implementations in which processor(s) 132 includes multiple processing units, one or more of components 110, 112, 114, 116, 118, 120, 122, 124, and/or 126 may be implemented remotely from the other components. The description of the functionality provided by the different components 110, 112, 114, 116, 118, 120, 122, 124, and/or 126 described below is for illustrative purposes, and is not intended to be limiting, as any of components 110, 112, 114, 116, 118, 120, 122, 124, and/or 126 may provide more or less functionality than is described. For example, one or more of components 110, 112, 114, 116, 118, 120, 122, 124, and/or 126 may be eliminated, and some or all of its functionality may be provided by other ones of components 110, 112, 114, 116, 118, 120, 122, 124, and/or 126. As another example, processor(s) 132 may be configured to execute one or more additional components that may perform some or all of the functionality attributed below to one of components 110, 112, 114, 116, 118, 120, 122, 124, and/or 126.

Figure 2:
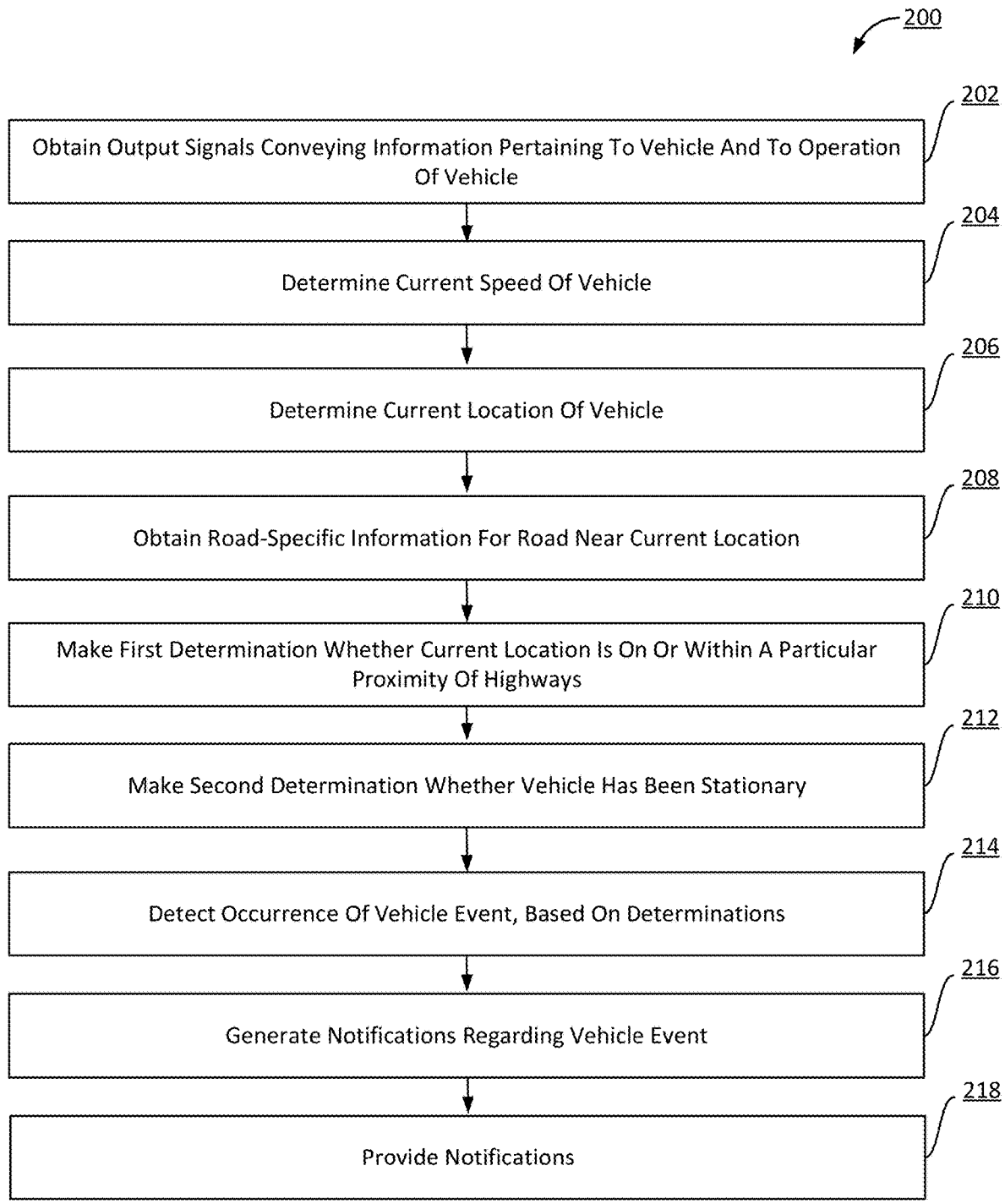
FIG. 2 illustrates a method for detecting a sitting duck scenario of a vehicle on or near a road, the vehicle being operated by a vehicle operator, in accordance with one or more implementations.

FIG. 2 illustrates a method 200 for detecting a sitting duck scenario of a vehicle on or near a road, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, output signals are generated that convey information pertaining to a particular vehicle and to the operation of the particular vehicle. Operation 202 may be performed by one or more sensors that are the same as or similar to set of sensors 108, in accordance with one or more implementations.

At an operation 204, a current speed of the vehicle is determined based on the output signals. In some embodiments, operation 204 is performed by a parameter determination component the same as or similar to parameter determination component 110 (shown in FIG. 1 and described herein).

At an operation 206, a current location of the vehicle is determined based on the output signals. In some embodiments, operation 206 is performed by a parameter determination component the same as or similar to parameter determination component 110 (shown in FIG. 1 and described herein).

At an operation 208, road-specific information is obtained for one or more roads near the current location of the vehicle. The road-specific information includes one or more types of road pertaining to the one or more roads near the current location of the vehicle, and one or more types of geographical location information pertaining to the one or more roads. In some embodiments, operation 208 is performed by a road-specific information component the same as or similar to road-specific information component 112 (shown in FIG. 1 and described herein).

At an operation 210, a first determination is made whether the current location of the vehicle is on or within a particular proximity of highways. The highways are public roads heading in one or more directions, having one or more traffic lanes heading in the one or more directions. The one or more traffic lanes are intended to include vehicular traffic. The first determination is based on the current location and the obtained road-specific information. The particular proximity is determined based on a distance threshold. In some embodiments, operation 210 is performed by a proximity component the same as or similar to proximity component 114 (shown in FIG. 1 and described herein). In some implementations, the distance threshold may be 100 feet or less. In some implementations, the distance threshold may vary based on one or more of road type, environmental conditions, and/or other factors.

At an operation 212, a second determination is made whether the vehicle has been stationary continuously for at least a specified duration. In some embodiments, operation 212 is performed by a stationary component the same as or similar to stationary component 116 (shown in FIG. 1 and described herein). In some implementations, the specified duration may be at least 5 minutes. In some implementations, the specified duration may vary based on one or more of road type, environmental conditions, and/or other factors.

At an operation 214, an occurrence is detected of a particular vehicle event responsive to a combination of at least two determinations. The at least two determinations include the first determination that the current location of the vehicle is on or within the particular proximity of highways and the second determination that the vehicle has been stationary continuously for at least the specified duration. In some embodiments, operation 214 is performed by a detection component the same as or similar to detection component 118 (shown in FIG. 1 and described herein).

At an operation 216, responsive to detection of the occurrence of the particular vehicle event, one or more notifications are generated regarding the particular vehicle event. In some embodiments, operation 216 is performed by a notification component the same as or similar to notification component 120 (shown in FIG. 1 and described herein).

At an operation 218, the one or more notifications are provided to one or more of the vehicle operator and/or a remote computing server (e.g., remote computing server 129). In some embodiments, operation 218 is performed by a notification component the same as or similar to notification component 120 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for detecting a sitting duck scenario of a vehicle on or near a road, the vehicle being operated by a vehicle operator, the system comprising:
   one or more hardware processors configured by machine-readable instructions to:
      obtain output signals conveying information pertaining to the vehicle and to operation of the vehicle;
      determine a current speed of the vehicle, wherein the determination of the current speed is based on the output signals;
      determine a current location of the vehicle, wherein the determination of the current location is based on the output signals;
      obtain road-specific information for one or more roads near the current location of the vehicle, wherein the road-specific information includes:
         i) one or more types of road pertaining to the one or more roads near the current location of the vehicle, and
         ii) one or more types of geographical location information pertaining to the one or more roads;
      make a first determination whether the current location of the vehicle is on or within a particular proximity of highways, wherein the highways are public roads heading in one or more directions, having one or more traffic lanes heading in the one or more directions, wherein the one or more traffic lanes are intended to include vehicular traffic, wherein the first determination is based on the current location and the obtained road-specific information, and wherein the particular proximity is determined based on a distance threshold;
make a second determination whether the vehicle has been stationary continuously for at least a specified duration;
detect an occurrence of a particular vehicle event responsive to a combination of at least two determinations, wherein the at least two determinations include the first determination that the current location of the vehicle is on or within the particular proximity of highways and the second determination that the vehicle has been stationary continuously for at least the specified duration;
responsive to detection of the occurrence of the particular vehicle event, generate one or more notifications regarding the particular vehicle event; and
provide the one or more notifications to one or more of the vehicle operator and/or a remote computing server.

2. The system of claim 1, wherein the distance threshold is 100 feet or less, wherein the specified duration is at least 5 minutes, and wherein the one or more hardware processors are further configured by machine-readable instructions to:
make a third determination whether the vehicle is in one of a set of designated areas for stopping vehicles;
wherein detection of the occurrence of the particular vehicle event is further responsive to the third determination that the vehicle is not in one of the set of designated areas for stopping vehicles.

3. The system of claim 1, wherein the one or more hardware processors are further configured by machine-readable instructions to:
make a fourth determination whether the vehicle is stationary in an orientation parallel to the particular road;
wherein the detection of the occurrence of the particular vehicle event is further responsive to the fourth determination that the vehicle is stationary in the orientation parallel to the particular road.

4. The system of claim 2, wherein the set of designated areas for stopping vehicles includes rest stops and travel centers.

5. The system of claim 4, wherein the set of designated areas for stopping vehicles further includes common stop areas that have been identified based on historical vehicle usage.

6. The system of claim 1, wherein the first determination includes a determination whether any part of the vehicle is within a specified minimum distance of any part of the highway, wherein the specified minimum distance is at least 25 feet.

7. The system of claim 1, wherein the one or more hardware processors are further configured by machine-readable instructions to:
determine whether the vehicle was traveling at least 50 mph for at least 5 minutes in a particular time frame, wherein the particular time frame includes a duration of at least 10 minutes immediately preceding the specified duration for the second determination that the vehicle has been stationary.

8. The system of claim 1, wherein determining the current location of the vehicle includes determining a current road selected from the one or more roads such that the current road is closer to the current location of the vehicle than other roads in the one or more roads, wherein the current road has a centerline between traffic lanes heading in opposite directions, wherein the combination of at least two determinations includes a determination that the vehicle is stationary in an orientation parallel to the current road, and wherein the first determination is that the current location of the vehicle is within 50 feet of the centerline of the current road.

9. The system of claim 1, wherein the one or more hardware processors are further configured by machine-readable instructions to:
obtain current weather conditions based on the current location of the vehicle,
wherein the distance threshold used to determine the particular proximity varies based on the current weather conditions.

10. The system of claim 1, wherein the distance threshold used to determine the particular proximity varies based on one or more of (i) a particular type of a road closest to the current location of the vehicle, (ii) a particular type of the obtained geographical location information, (iii) how many traffic lanes are heading in the same direction as the vehicle at the current location of the vehicle, (iv) how many traffic lanes form the road closest to at the current location of the vehicle, and (v) a speed limit for the road closest to at the current location of the vehicle.

11. A method for detecting a sitting duck scenario of a vehicle on or near a road, the vehicle being operated by a vehicle operator, the method comprising:
obtaining output signals conveying information pertaining to the vehicle and to operation of the vehicle;
determining a current speed of the vehicle based on the output signals;
determining a current location of the vehicle based on the output signals;
obtaining road-specific information for one or more roads near the current location of the vehicle, wherein the road-specific information includes one or more types of road pertaining to the one or more roads near the current location of the vehicle, and one or more types of geographical location information pertaining to the one or more roads;
making a first determination whether the current location of the vehicle is on or within a particular proximity of highways, wherein the highways are public roads heading in one or more directions, having one or more traffic lanes heading in the one or more directions, wherein the one or more traffic lanes are intended to include vehicular traffic, wherein the first determination is based on the current location and the obtained road-specific information, and wherein the particular proximity is determined based on a distance threshold;
making a second determination whether the vehicle has been stationary continuously for at least a specified duration;
detecting an occurrence of a particular vehicle event responsive to a combination of at least two determinations, wherein the at least two determinations include the first determination that the current location of the vehicle is on or within the particular proximity of highways and the second determination that the vehicle has been stationary continuously for at least the specified duration;
responsive to detection of the occurrence of the particular vehicle event, generating one or more notifications regarding the particular vehicle event; and
providing the one or more notifications to one or more of the vehicle operator and/or a remote computing server.

12. The method of claim 11, wherein the distance threshold is 100 feet or less, wherein the specified duration is at least 5 minutes, wherein the method further comprises:

making a third determination whether the vehicle is in one of a set of designated areas for stopping vehicles;

wherein detection of the occurrence of the particular vehicle event is further responsive to the third determination that the vehicle is not in one of the set of designated areas for stopping vehicles.

13. The method of claim 11, further comprising:

making a fourth determination whether the vehicle is stationary in an orientation parallel to the particular road;

wherein detection of the occurrence of the particular vehicle event is further responsive to the fourth determination that the vehicle is stationary in the orientation parallel to the particular road.

14. The method of claim 12, wherein the set of designated areas for stopping vehicles includes rest stops and travel centers.

15. The method of claim 14, wherein the set of designated areas for stopping vehicles further includes common stop areas that have been identified based on historical vehicle usage.

16. The method of claim 11, wherein the first determination includes a determination whether any part of the vehicle is within a specified minimum distance of any part of the highway, wherein the specified minimum distance is at least 25 feet.

17. The method of claim 11, further comprising:

determining whether the vehicle was traveling at least 50 mph for at least 5 minutes in a particular time frame, wherein the particular time frame includes a duration of at least 10 minutes immediately preceding the specified duration for the second determination that the vehicle has been stationary.

18. The method of claim 11, wherein determining the current location of the vehicle includes determining a current road selected from the one or more roads such that the current road is closer to the current location of the vehicle than other roads in the one or more roads, wherein the current road has a centerline between traffic lanes heading in opposite directions, wherein the combination of at least two determinations includes a determination that the vehicle is stationary in an orientation parallel to the current road, and wherein the first determination is that the current location of the vehicle is within 50 feet of the centerline of the current road.

19. The method of claim 11, further comprising:

obtaining current weather conditions based on the current location of the vehicle, wherein the distance threshold used to determine the particular proximity varies based on the current weather conditions.

20. The method of claim 11, wherein the distance threshold used to determine the particular proximity varies based on one or more of (i) a particular type of a road closest to the current location of the vehicle, (ii) a particular type of the obtained geographical location information, (iii) how many traffic lanes are heading in the same direction as the vehicle at the current location of the vehicle, (iv) how many traffic lanes form the road closest to at the current location of the vehicle, and (v) a speed limit for the road closest to at the current location of the vehicle.

* * * * *